United States Patent
Browne et al.

(10) Patent No.: US 12,261,285 B2
(45) Date of Patent: Mar. 25, 2025

(54) CONTROL OF FURNACE ATMOSPHERE FOR IMPROVING CAPACITY RETENTION OF SILICON-DOMINANT ANODE CELLS

(71) Applicant: ENEVATE CORPORATION, Irvine, CA (US)

(72) Inventors: Ian Browne, Orange, CA (US); Benjamin Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 367 days.

(21) Appl. No.: 16/677,027

(22) Filed: Nov. 7, 2019

(65) Prior Publication Data

US 2021/0143402 A1  May 13, 2021

(51) Int. Cl.
| | | |
|---|---|---|
| *H01M 4/1395* | (2010.01) | |
| *H01M 4/134* | (2010.01) | |
| *H01M 4/02* | (2006.01) | |

(52) U.S. Cl.
CPC ......... *H01M 4/1395* (2013.01); *H01M 4/134* (2013.01); *H01M 2004/027* (2013.01)

(58) Field of Classification Search
CPC ..... H01M 2004/028; H01M 2004/027; H01M 4/134; H01M 4/1395; H01M 4/0471; B01D 67/0067
See application file for complete search history.

(56) References Cited

U.S. PATENT DOCUMENTS

| | | | | |
|---|---|---|---|---|
| 4,816,081 A | * | 3/1989 | Mehta | F26B 7/00 134/134 |
| 2004/0239019 A1 | * | 12/2004 | Shimosato | F27B 9/045 266/252 |
| 2012/0003547 A1 | * | 1/2012 | Raj | H01M 4/625 429/322 |
| 2012/0100402 A1 | * | 4/2012 | Nesper | H01M 4/364 429/48 |
| 2013/0015175 A1 | * | 1/2013 | Karl | C01B 32/05 219/385 |

(Continued)

FOREIGN PATENT DOCUMENTS

| | | | |
|---|---|---|---|
| CN | 109817962 | * | 5/2019 |
| CN | 201910259186.5 | * | 5/2019 |

OTHER PUBLICATIONS

Notification of Transmittal of the International Search Report and Written Opinion of the International Searching Authority, dated Nov. 23, 2020, 7 pages.

*Primary Examiner* — Tabassom Tadayyon Eslami
(74) *Attorney, Agent, or Firm* — McAndrews, Held & Malloy, Ltd.

(57) ABSTRACT

Systems and methods are provided for control of furnace atmosphere for improving capacity retention of silicon-dominant anode cells. Furnace atmosphere may be controlled during processing of a silicon-dominated electrode in a furnace, with the processing including pyrolysis of the silicon-dominated electrode, and the controlling including setting or adjusting one or more of pressure of the furnace atmosphere, and composition of the furnace atmosphere. The controlling of the furnace atmosphere may be configured based on at least one environment condition. The at least one environment condition may be an oxygen-free environment.

24 Claims, 9 Drawing Sheets

(56) References Cited

U.S. PATENT DOCUMENTS

| | | | | |
|---|---|---|---|---|
| 2014/0295290 | A1* | 10/2014 | Park | H01M 4/0404 |
| | | | | 429/342 |
| 2015/0349337 | A1* | 12/2015 | Sugiyama | H01M 4/134 |
| | | | | 429/213 |
| 2019/0355980 | A1* | 11/2019 | Holt | H01M 10/0525 |
| 2021/0135193 | A1* | 5/2021 | Wang | H01M 4/387 |

* cited by examiner

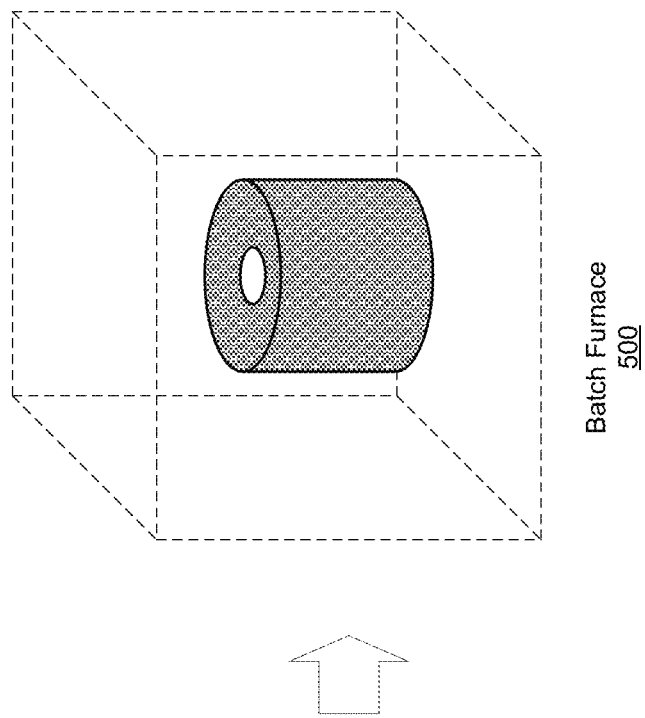
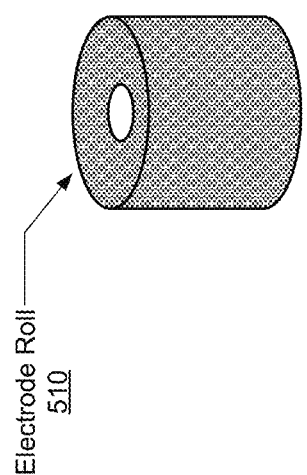
FIG. 5

CONTROL OF FURNACE ATMOSPHERE FOR IMPROVING CAPACITY RETENTION OF SILICON-DOMINANT ANODE CELLS

TECHNICAL FIELD

Aspects of the present disclosure relate to energy generation and storage. More specifically, certain implementations of the present disclosure relate to methods and systems for control of furnace atmosphere for improving capacity retention of silicon-dominant anode cells.

BACKGROUND

Various issues may exist with conventional battery technologies. In this regard, conventional systems and methods, if any existed, for implementing battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for control of furnace atmosphere for improving capacity retention of silicon-dominant anode cells, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF THE DRAWINGS

FIG. 5 illustrates an example batch furnace configured for processing silicon-dominant electrodes with controlled furnace atmosphere, in accordance with an example embodiment of the disclosure.

DETAILED DESCRIPTION

Figure 1:
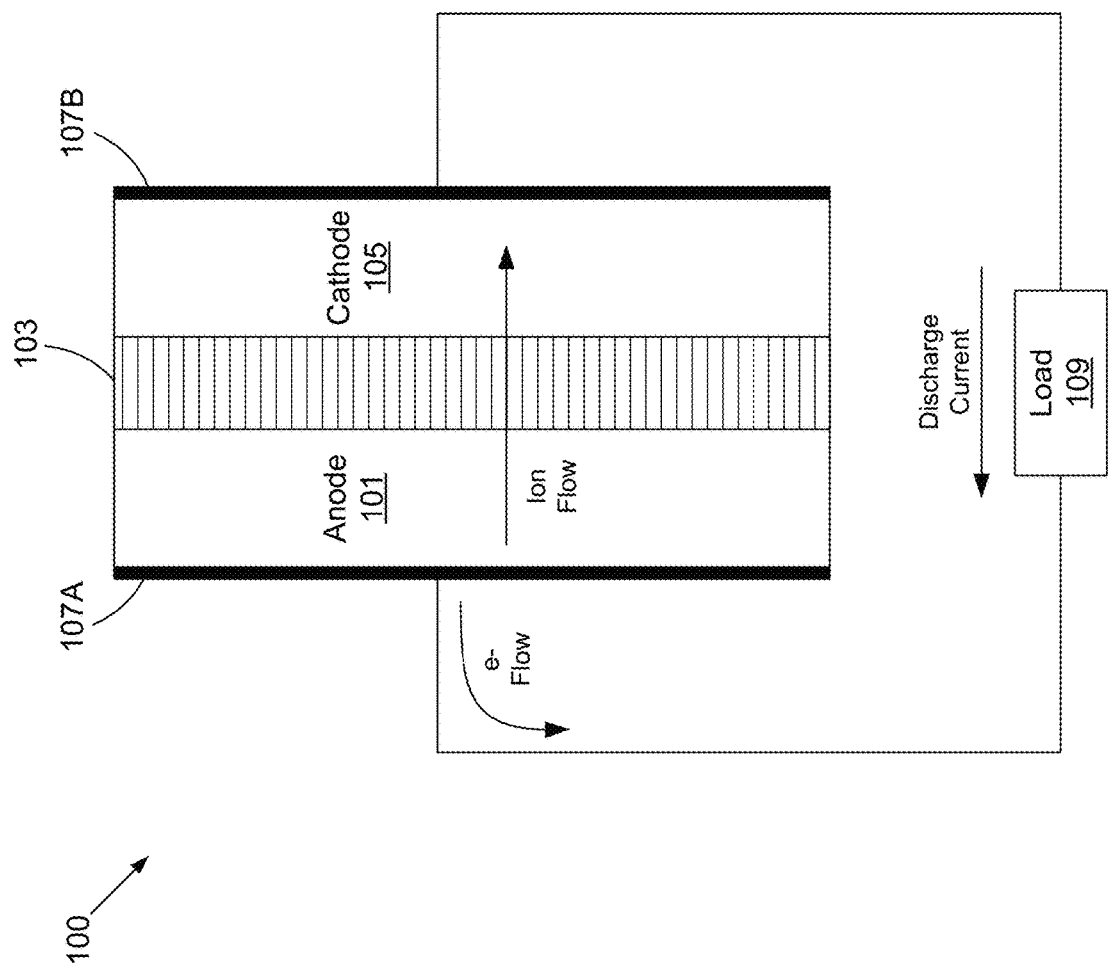
FIG. 1 is a diagram of a battery with electrode processed with controlled furnace atmosphere, in accordance with an example embodiment of the disclosure.

FIG. 1 is a diagram of a battery with electrode processed with controlled furnace atmosphere, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 1078. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. $Li/Li^+$, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Performance of cells may be improved, such as by incorporating use of certain techniques that may yield improvements in performance of components of the cells (and thus the cells themselves). For example, controlling conditions associated with electrodes processing may result in improvement to various attributes of the electrodes (e.g., capacity retention), which would in turn improve performance of the cells. In various implementations in accordance with the present disclosure, controlling atmosphere conditions associated with electrode processing may be used for improving performance of electrodes. This is described further with respect to FIGS. 5-8.

Figure 2:
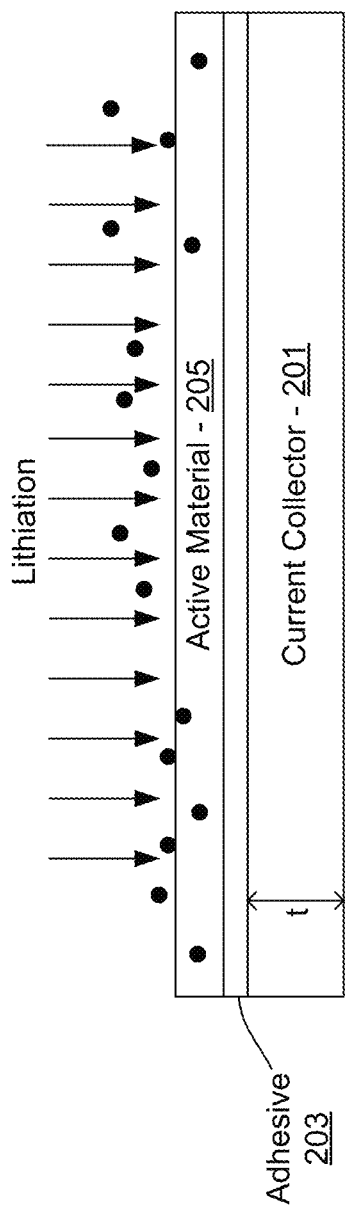
FIG. 2 illustrates an example silicon-dominant anode, in accordance with an example embodiment of the disclosure.

FIG. 2 illustrates an example silicon-dominant anode, in accordance with an example embodiment of the disclosure. Referring to FIG. 2, there is shown an anode 200, a current collector 201, an adhesive 203, and an active material 205. It should be noted, however, that the adhesive 203 may or may not be present depending on the type of anode fabrication process utilized, as the adhesive is not necessarily there in a direct coating process where the active material is formed directly on the current collector.

In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium particles impinging upon and lithiating the active material 205. Also, as illustrated in FIG. 2, the current collector 201 has a thickness t, which may vary based on the particular implementation. In this regard, in some implementations thicker foils may be used while in other implementations thinner foils are used. Example thicker foils may be greater than 6 µm, such as 10 µm or 20 µm for copper, for example, while thinner foils may be less than 6 µm thick in copper.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing.

Figure 3:
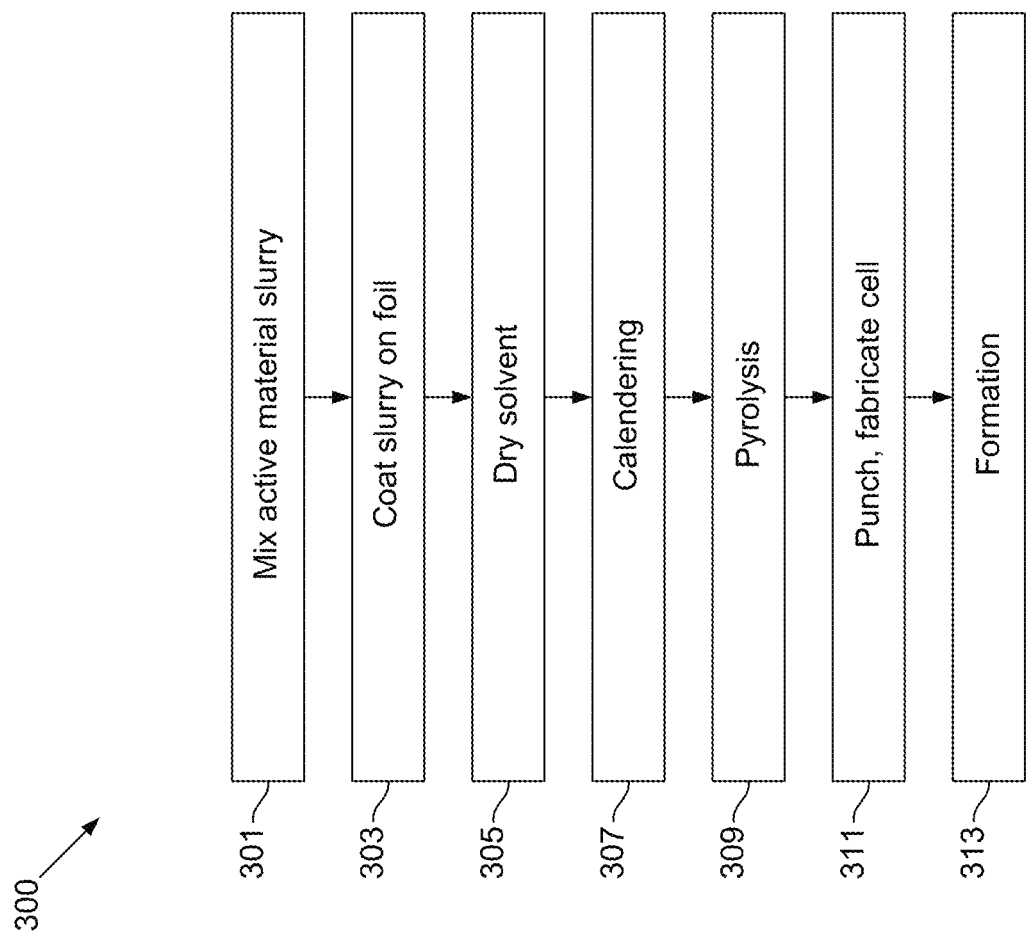
FIG. 3 is a flow diagram of a process for direct coating electrodes, in accordance with an example embodiment of the disclosure.

FIG. 3 is a flow diagram of a process for direct coating electrodes, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 4.

In step 301, the raw electrode active material may be mixed using a binder/resin (such as PI, PAI), solvent, and conductive carbon. For example, graphene/VGCF (1:1 by weight) may be dispersed in N-Methyl pyrrolidone (NMP) under sonication for, e.g., 1 hour followed by the addition of Super P (1:1:1 with VGCF and graphene) and additional sonication for, e.g., 45-75 minutes. Silicon powder with a desired particle size, may then be dispersed in polyamic acid resin (15% solids in NMP) at, e.g., 1000 rpm in a ball miller for a designated time, and then the conjugated carbon/NMP slurry may be added and dispersed at, e.g., 2000 rpm for, e.g., another predefined time to achieve a slurry viscosity within 2000-4000 cP and a total solid content of about 30%. The particle size and mixing times may be varied to configure the active material density and/or roughness.

In step 303, the slurry may be coated on the foil at a loading of, e.g., 3-4 mg/cm$^2$, which may undergo drying in step 305 resulting in less than 15% residual solvent content. In step 307, an optional calendering process may be utilized where a series of hard pressure rollers may be used to finish the film/substrate into a smoother and denser sheet of material.

In step 309, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 311. If done in roll form, the punching is done after the pyrolysis process. The punched electrode may then be sandwiched with a separator and cathode with electrolyte to form a cell.

In step 313, the cell may be subjected to a formation process, comprising initial charge and discharge steps to lithiate the anode, with some residual lithium remaining.

In accordance with the present disclosure, atmosphere conditions associated with processing the electrode, particularly prior to and/or during the pyrolysis step, may improve performance of electrodes. This is described further with respect to FIGS. 5-8.

Figure 4:
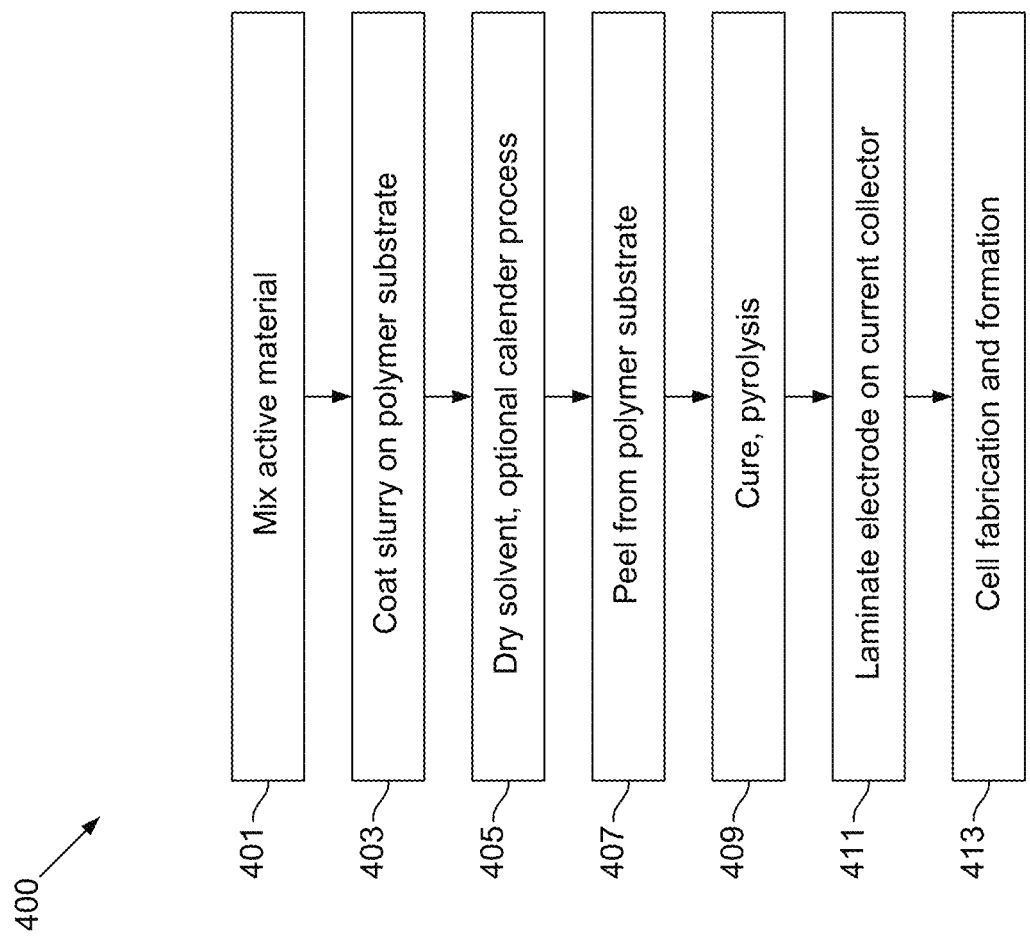
FIG. 4 is a flow diagram of an alternative process for transfer lamination of electrodes, in accordance with an example embodiment of the disclosure.

FIG. 4 is a flow diagram of an alternative process for transfer lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 4, starting with step 401 where the active material may be mixed with a binder/resin such as polyimide (PI) or polyamide-imide (PAI), solvent, the silosilazane additive, and optionally a conductive carbon. As with the process described in FIG. 4, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 403, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 405. An optional calendering process may be utilized where a series of hard pressure rollers may be used to finish the film/substrate into a smoothed and denser sheet of material.

In step 407, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 409 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 411, the pyrolyzed material may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 413, the electrode may then be sandwiched with a separator and cathode with electrolyte to form a cell. The cell may be subjected to a formation process, comprising initial charge and discharge steps to lithiate the anode, with some residual lithium remaining.

In accordance with the present disclosure, atmosphere conditions associated with processing the electrode, particularly prior to and/or during the pyrolysis step, may improve performance of electrodes. This is described further with respect to FIGS. 5-8.

FIG. 5 illustrates an example batch furnace configured for processing silicon-dominant electrodes with controlled furnace atmosphere, in accordance with an example embodiment of the disclosure. Show in FIG. 5 is a batch furnace 500 which may be used in processing electrodes, particularly silicon-dominant anodes.

The furnace 500 may be used during processing of electrodes, particularly for performing pyrolysis. The furnace 500 may support electrodes arranged in various ways, such as rolls, sheets, etc. For example, the furnace 500 may be configured for processing electrode rolls (e.g., electrode roll 510 shown in FIG. 5). In this regard, the electrode roll 510 may comprise a long sheet, comprising electrode material applied on current collector (e.g., copper), that is rolled on a cylindrical core. The invention is not limited to a particular type of electrode arrangements (e.g., rolls), however, and may be used with any suitable electrode arrangement. As shown in FIG. 5, the furnace 500 may be used for single batch processing (e.g., a single electrode roll).

In accordance with the present disclosure, the furnace 500 may be configured for electrode processing with controlled furnace atmosphere. In this regard, various measures may be used to set and/or adjust the furnace atmosphere, particularly in a controlled manner that optimizes and/or enhances electrode processing (e.g., pyrolysis) performed therein. For example, attributes such as pressure, composition of the furnace atmosphere (gases contained therein), etc., and/or combinations thereof, may be adjusted or controlled (e.g., for reducing atmosphere) during pyrolysis of electrodes, which may result in improvements to performance of the electrode—e.g., with respect to capacity retention. In this regard, controlled furnace atmosphere may be used for different processing techniques. For example, a reducing atmosphere during pyrolysis may be used for both direct-coating and lamination based processing. In this regard, a reducing atmosphere during pyrolysis of direct-coated silicon-dominant anodes and/or during pyrolysis of silicon-dominant silicon-carbon composite coupons used in laminated silicon-dominant anodes may similarly result in improved capacity retention.

Controlling atmosphere may be configured for ensuring conditions that may be determined to have positive effects on electrode processing. For example, with silicon-dominated electrodes, performance of electrode processing may be improved if the processing (e.g., pyrolysis) is done in an oxygen-free environment. Accordingly, controlling furnace atmosphere may include adjusting or creating atmosphere conditions that may ensure reducing or eliminating oxygen (e.g., by inclusion of gases in the furnace atmosphere that may ensure reducing or eliminating oxygen, such as hydrogen).

In various implementations, controlled furnace atmosphere may comprise controlling and/or adjusting pressure. For example, pyrolysis may be performed under low pressure conditions (e.g., in a vacuum chamber with the vessel pressure substantially below atmospheric pressure). Positive pressure (e.g., above atmospheric pressure) may also be used during controlled furnace atmosphere. This may be done, for example, to maintain created atmosphere conditions (e.g., by keeping contaminants out).

Controlling furnace atmosphere may also comprise controlling and/or adjusting the composition of the furnace atmosphere—e.g., gases included therein. In this regard, furnaces may typically be filled with inert gases, such as Argon (Ar). With silicon-dominated electrodes, however, processing may be enhanced by using combinations that include other, non-inert gases. A reducing atmosphere may be used, for example, by creating atmosphere that contains hydrogen, carbon monoxide (CO), carbon dioxide/carbon monoxide ($CO_2$/CO) blends (e.g., from combustion products of various fuels), dissociated ammonia (forming gas), etc., or a mixture of the above.

In batch-like process, as would be performed in a batch furnace (e.g., the batch furnace 500 of FIG. 5), the functions described herein may be performed after creating vacuum (and injecting of inert gas). Thus, after the electrode roll 510 is placed in the furnace 500, vacuum is first created, then inert gas (e.g., Argon) is injected into the furnace. A reducing atmosphere may then be created, such as by adjusting pressure in the furnace, adding particularly selected gases, etc., with at least some of these measures being selected and/or configured for enhancing performance of electrode processing (e.g., by ensuring oxygen-free environment). The pyrolysis step may then be performed. In an example implementation, hydrogen flames may be used (provided via suitable flame sources within the furnace) to further ensure removal of oxygen within the furnace.

In some instances, controlled furnace atmosphere may be prepared as a multi-step process, which may include successively subjecting the electrode to vacuum and reducing atmosphere, before performing the pyrolysis step. This may be done to, e.g., ensure an oxygen-free environment. In this regard, with existing solutions, where vacuum conditions are created leading up to the pyrolysis process, some oxidation may still take place, which may adversely affect performance. Thus, subjecting the electrode to vacuum and reducing atmosphere (particularly when these steps are repeated a number of times) may enhance performance, by ensuring that all oxygen is scavenged before the pyrolysis step.

While not shown in FIG. 5, the furnace 500 may incorporate components (e.g., sensors, control circuitry, etc., not shown) to provide the necessary sensory and control functions associated with controlled furnace atmosphere as described herein.

Figure 6:
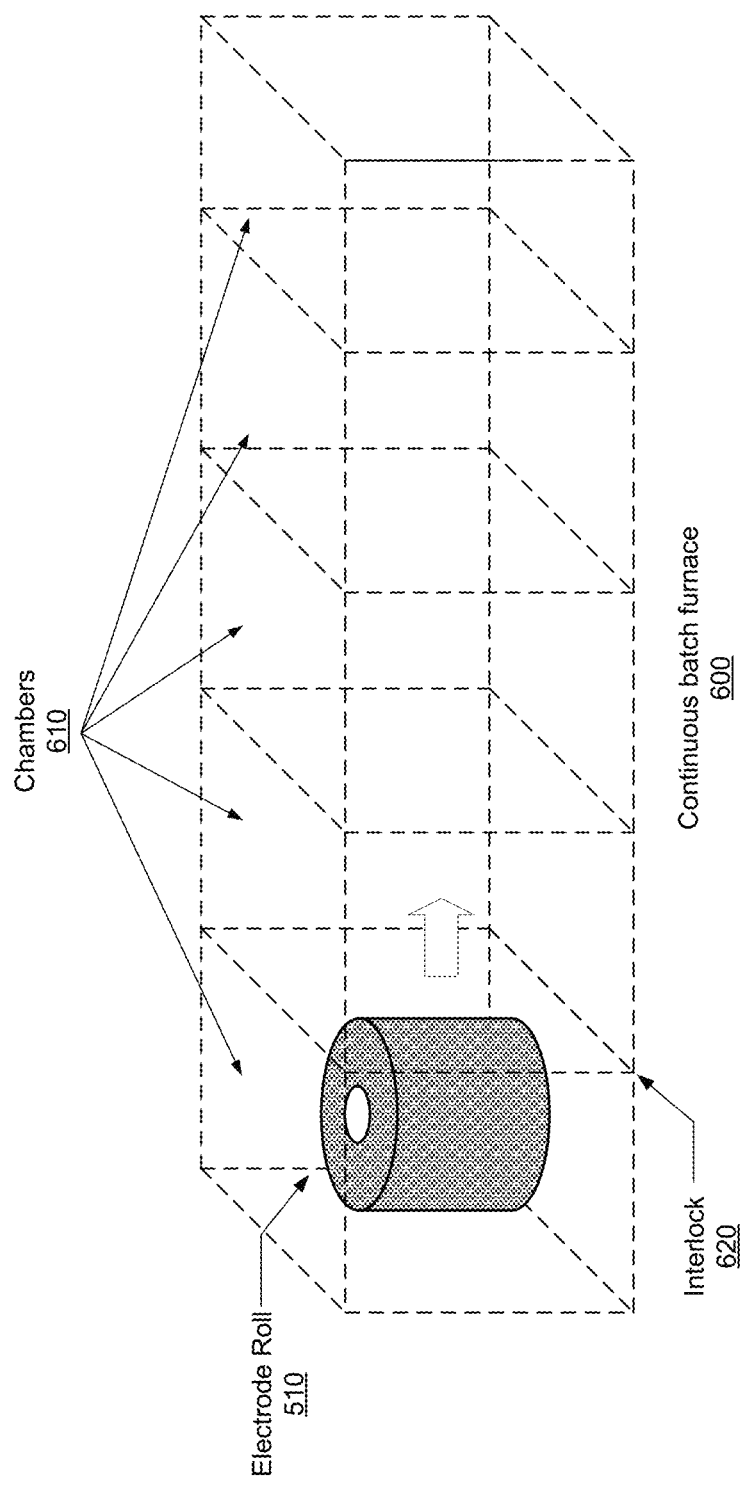
FIG. 6 illustrates an example continuous batch furnace configured for processing silicon-dominant electrodes with controlled furnace atmosphere, in accordance with an example embodiment of the disclosure.

FIG. 6 illustrates an example continuous batch furnace configured for processing silicon-dominant electrodes with controlled furnace atmosphere, in accordance with an example embodiment of the disclosure. Shown in FIG. 6 is a continuous batch furnace 600 which may be used in processing electrodes, particularly silicon-dominant anodes.

The continuous batch furnace 600 may be similar to the furnace 500 as described with respect to FIG. 5. The continuous batch furnace 600, however, may be configured for supporting continuous batch processing. As such, the continuous batch furnace 600 may comprise a plurality of chambers (or ports) 610.

The continuous batch furnace 600 may similarly be configured for supporting controlled furnace atmosphere, as described with respect to FIG. 5. However, the continuous batch furnace 600 may be particularly suitable for providing electrode processing with controlled furnace atmosphere in a multi-step manner.

For example, by incorporating interlocks 620 between the chambers 610, the functions described above (e.g., steps of vacuum, filling space with inert gas, applying reducing atmosphere measures, which may include measures for removal and/or scavenging of oxygen, such as injecting gases that removes oxygen, use hydrogen flames, etc.) may be applied in sequence, at different points throughout the chain, in the different chambers 610, with the interlocks 620 allowing for different actions (and corresponding conditions) being applied in adjacent chambers 610 without affecting one another.

Figure 7:
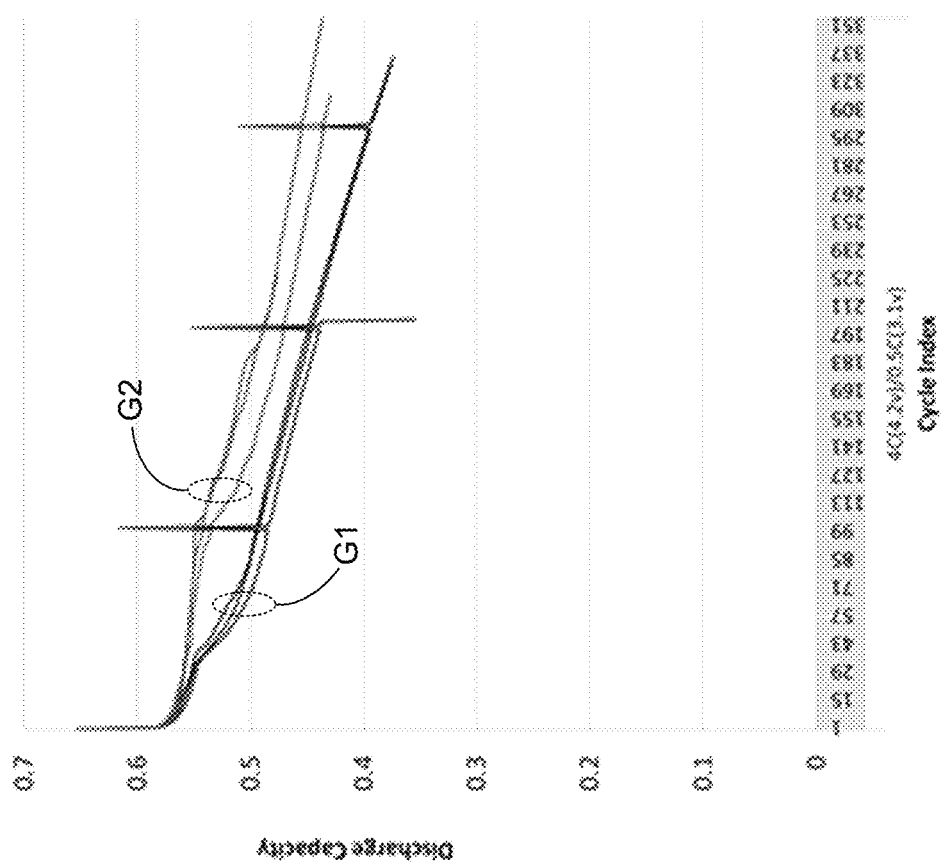
FIG. 7 is a plot illustrating discharge capacity performance for anode processes using different atmospheric conditions, in accordance with an example embodiment of the disclosure.

FIG. 7 is a plot illustrating discharge capacity performance for anode processes using different atmospheric conditions, in accordance with an example embodiment of the disclosure.

The plot shown in FIG. 7 compares the discharge capacities of anodes corresponding to two different groups: group 1 (G1) and group 2 (G2). In this regard, both groups comprise direct coated silicon-dominant anodes, which in the example implementation corresponding to FIG. 7 are prepared by coating a copper current collector with a slurry containing silicon, Super P (carbon), polyamide-imide (PAI), and N-Methyl pyrrolidone (NMP). The anodes of group G1 are heat-treated at 600° C. in atmosphere of 100% Argon (Ar); the anodes of group G2 are similarly heat-treated at 600° C. but in atmosphere of 5% hydrogen ($H_2$) in Argon (Ar).

After the heat-treating, the anodes are assembled into cells—e.g., being assembled into 5-layer cells, paired with 92% NCA (Lithium Nickel Cobalt Aluminum Oxide ($LiNiCoAlO_2$)) cathodes. The cells cycled using different testing protocols. In this regard, as shown in the plot in FIG. 7, the discharge capacity of the formed cells is measured under 4 C charge to 4.2V and 0.5 C discharge to 3.1V (4 C(4.2V)/0.5 C(3.1V)) test conditions. As shown in the chart in FIG. 7, cells made using anodes prepared in the hydrogen-containing atmosphere exhibit better capacity retention.

Figure 8:
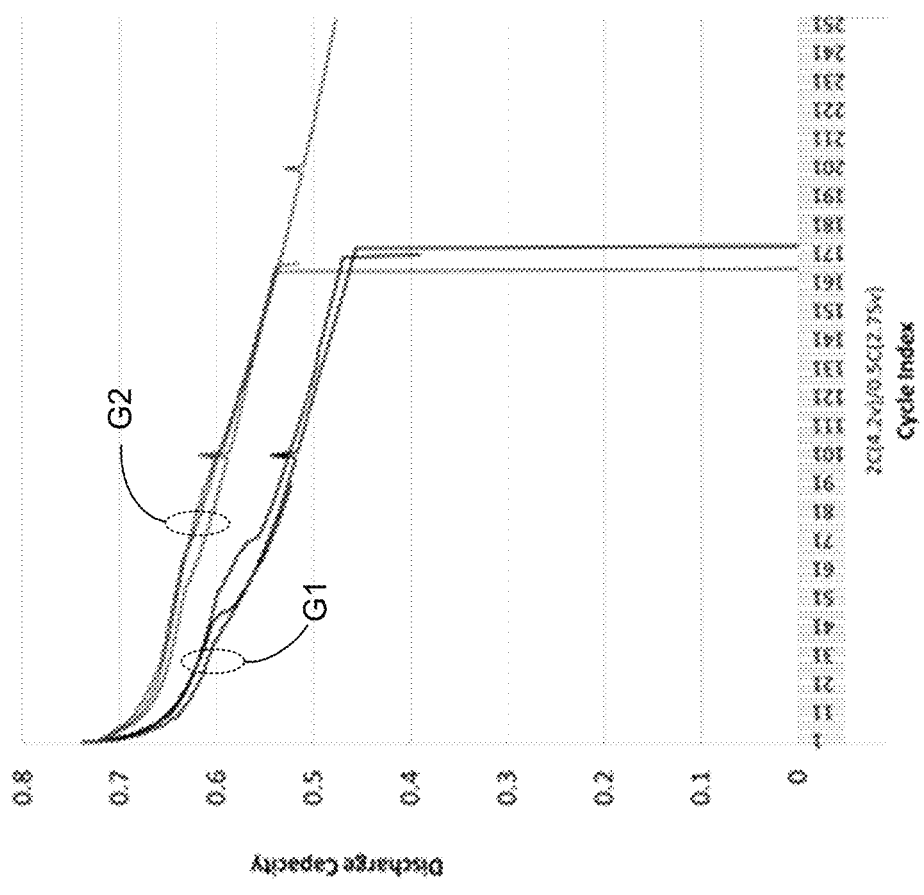
FIG. 8 is a plot illustrating discharge capacity performance for anode processes using different atmospheric conditions under different test conditions, in accordance with an example embodiment of the disclosure.

FIG. 8 is a plot illustrating discharge capacity performance for anode processes using different atmospheric conditions under different test conditions, in accordance with an example embodiment of the disclosure. The plot shown in FIG. 8 compares the discharge capacities of anodes corresponding the two groups described with respect to FIG. 7—that is, group 1 (G1) and group 2 (G2).

In this regard, as noted above, both groups comprise direct coated silicon-dominant anodes, prepared by coating a copper current collector with a slurry containing silicon, Super P (carbon), polyamide-imide (PAI), and N-Methyl pyrrolidone (NMP), and then heat-treated at 600° C., in atmosphere of 100% Argon for group 1 (G1) and in atmosphere of 5% $H_2$ in Argon for group 2 (G2). Further, as noted above, anodes of both groups are assembled into cells in similar manner—e.g., being assembled into 5-layer cells, paired with 92% NCA cathodes. As shown in the plot in FIG. 8, however, the cells are cycled and the discharge capacity is measured under 2 C charge to 4.2V and 0.5 C discharge to 2.75V (2 C(4.2V)/0.5 C(2.75V)) test conditions. As shown in the chart in FIG. 8, cells made using anodes prepared in the hydrogen-containing atmosphere again exhibit better capacity retention.

As FIGS. 7 and 8 illustrate, controlling furnace atmosphere (e.g., by including Hydrogen) results in improved capacity retention performance. For example, as illustrated in FIGS. 7 and 8, an increase of >5% in capacity retention after 100 cycles may be achieved compared to a less-reducing atmosphere, or >90% capacity retention after 100 cycles for capacity retention in the case of using a reducing atmosphere. Further, sudden drops in capacity (slope change) may be moved out further (e.g., more than 50 cycles in cycling) when using a more reducing atmosphere.

Figure 9:
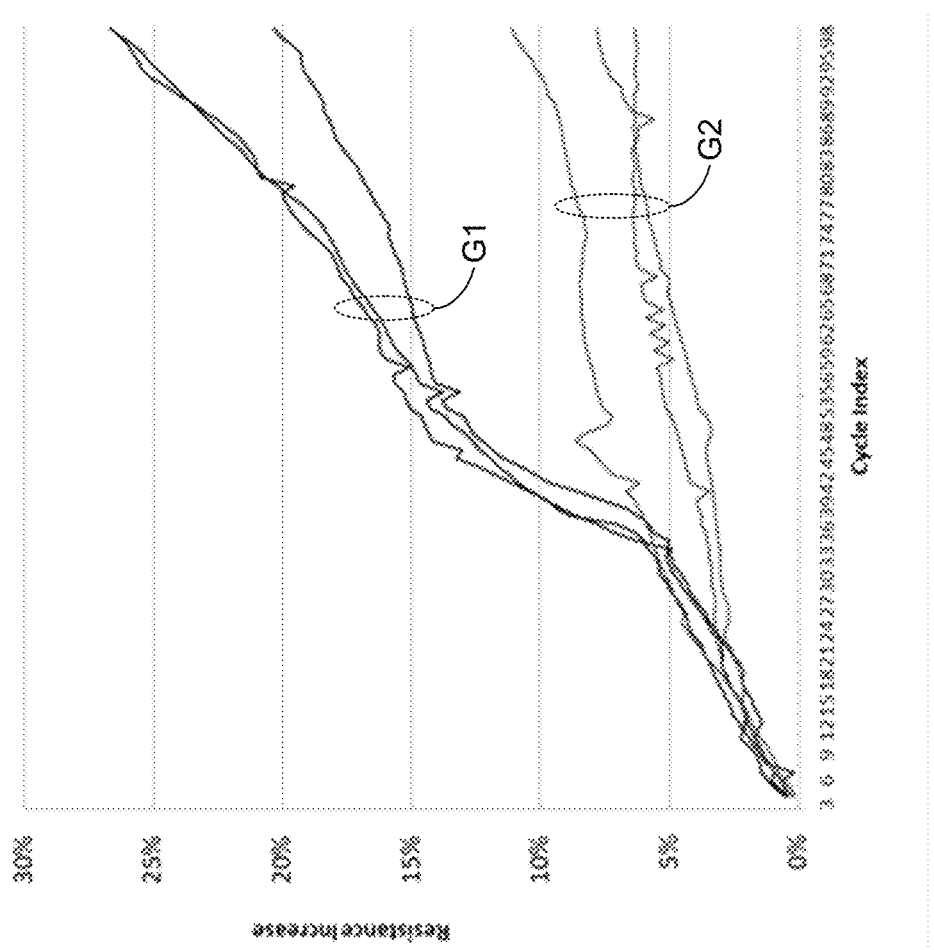
FIG. 9 is a plot illustrating resistance performance for anode processes using different atmospheric conditions, in accordance with an example embodiment of the disclosure.

FIG. 9 is a plot illustrating resistance performance for anode processes using different atmospheric conditions, in accordance with an example embodiment of the disclosure. The plot shown in FIG. 9 compares the resistance performance for anodes corresponding the two groups described with respect to FIG. 7—that is, group 1 (G1) and group 2 (G2).

In this regard, as noted above, both groups comprise direct coated silicon-dominant anodes, prepared by coating a copper current collector with a slurry containing silicon, Super P (carbon), polyamide-imide (PAI), and N-Methyl pyrrolidone (NMP), and then heat-treated at 600° C., in atmosphere of 100% Argon for group 1 (G1) and in atmosphere of 5% $H_2$ in Argon for group 2 (G2). Further, as noted above, anodes of both groups are assembled into cells in similar manner—e.g., being assembled into 5-layer cells, paired with 92% NCA cathodes.

As shown in the plot in FIG. 9, cells incorporating anodes prepared in the hydrogen-containing atmosphere (G2 anodes) exhibit better resistance performance compared to cells incorporating anodes prepared in prepared in the 100% Argon atmosphere (G1 anodes), as the resistance of the G2 anodes (or cell containing these anodes) increases at lower rate with increased cycles. In other words, use of more reducing atmosphere slows the increase of DC cell resistance during cycling. For example, as illustrated in FIG. 9, a more reducing pyrolysis environment may result in 10% resistance increase after 100 cycles, whereas a less reducing pyrolysis environment may result in a 20% resistance increase after 100 cycles.

An example method for electrode processing, in accordance with the present disclosure, comprises controlling furnace atmosphere during processing of a silicon-dominated electrode in a furnace, with the processing comprising pyrolysis of the silicon-dominated electrode, and the controlling comprising setting or adjusting one or more of: pressure of the furnace atmosphere, and composition of the furnace atmosphere.

In an example embodiment, the method further comprises configuring the controlling of the furnace atmosphere based on at least one environment condition. The at least one environment condition may comprise an oxygen-free environment.

In an example embodiment, the method further comprises configuring the controlling of the furnace atmosphere for removing and/or scavenging oxygen in the furnace before the pyrolysis of the silicon-dominated electrode.

In an example embodiment, the controlling comprises applying one or more adjustments for removing or scavenging oxygen in the furnace before the pyrolysis of the silicon-dominated electrode.

In an example embodiment, the method further comprises setting or adjusting the composition of the furnace atmosphere such that it comprises an inert gas and at least one additional gas. The inert gas may comprise Argon (Ar).

In an example embodiment, the method further comprises selecting the at least one additional gas based on at least one performance criterion, the at least one performance criterion comprising removal of oxygen. The at least one additional gas may comprise one or more of hydrogen ($H_2$), carbon monoxide (CO), carbon dioxide/carbon monoxide ($CO_2$/CO) blend, and forming gas.

In an example embodiment, the at least one additional gas comprises 5% of furnace atmosphere by volume.

In an example embodiment, the at least one additional gas comprises at most 10% of furnace atmosphere by volume.

In an example embodiment, setting or adjusting the pressure of the furnace atmosphere comprises reducing the pressure.

In an example embodiment, setting or adjusting the pressure of the furnace atmosphere comprises creating positive pressure in the furnace.

In an example embodiment, controlling the furnace atmosphere comprises creating vacuum environment in the furnace; and subsequently filling the furnace with an inert gas. The inert gas may comprise Argon (Ar).

In an example embodiment, controlling the furnace atmosphere comprises repeating the creating of vacuum environment in the furnace, and the subsequent filling of the furnace with the inert gas.

In an example embodiment, controlling the furnace atmosphere further comprises, after filling of the furnace with an inert gas, adding at least one additional gas into the furnace.

In an example embodiment, the method further comprises selecting the at least one additional gas based on at least one performance criterion, the at least one performance criterion comprising removal of oxygen. The at least one additional gas may comprise one or more of hydrogen ($H_2$), carbon monoxide (CO), carbon dioxide/carbon monoxide ($CO_2$/CO) blend, and forming gas.

In an example embodiment, the method further comprises configuring the controlling of the furnace atmosphere based on one or more cell performance parameters.

In an example embodiment, the one or more cell performance parameters comprise capacity retention.

In an example embodiment, the method further comprises configuring the controlling of the furnace atmosphere to increase capacity retention for a predefined number of cycles.

In an example embodiment, the one or more cell performance parameters comprise resistance.

In an example embodiment, the method further comprises configuring the controlling of the furnace atmosphere to reduce increase in resistance for a predefined number of cycles.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for electrode processing, the method comprising:
controlling furnace atmosphere during processing of a silicon-dominated electrode in a furnace, wherein:
the furnace comprises a plurality of chambers;
the processing comprises a plurality of steps comprising at least a pyrolysis step comprising pyrolysis of the silicon-dominated electrode, and one or more pre-pyrolysis steps comprising applying one or more pyrolysis related pre-pyrolysis functions;
at least some of the plurality of steps are applied in sequence, at different points in different ones of the plurality of chambers, with each of the pyrolysis step and the one or more pre-pyrolysis steps performed in different ones of the plurality of chambers; and
the controlling comprises:
creating in at least one of the plurality of chambers a vacuum environment in the furnace;
subsequently creating a non-vacuum environment in the at least one of the plurality of chambers, wherein creating the non-vacuum environment comprises setting or adjusting one or both of: pressure of the furnace atmosphere, and composition of the furnace atmosphere; and
applying one or more measures in a chamber where the pyrolysis step is applied, wherein the one or more measures are set or configured to maintain at least one environment condition created in the furnace prior to initiating of the pyrolysis.

2. The method of claim 1, comprising configuring the controlling of the furnace atmosphere based on at least one environment condition.

3. The method of claim 2, wherein the at least one environment condition comprises an oxygen-free environment.

4. The method of claim 3, comprising configuring the controlling of the furnace atmosphere for removing and/or scavenging of oxygen in the furnace before the pyrolysis of the silicon-dominated electrode.

5. The method of claim 3, wherein the controlling comprises applying one or more adjustments for removing or scavenging oxygen in the furnace before the pyrolysis of the silicon-dominated electrode.

6. The method of claim 1, comprising setting or adjusting the composition of the furnace atmosphere such that it comprises an inert gas and at least one additional gas.

7. The method of claim 6, comprising selecting the at least one additional gas based on at least one performance criterion, the at least one performance criterion comprising removal of oxygen.

8. The method of claim 6, wherein the at least one additional gas comprises one or more of hydrogen ($H_2$), carbon monoxide (CO), carbon dioxide/carbon monoxide ($CO_2$/CO) blend, and forming gas.

9. The method of claim 6, wherein the at least one additional gas comprises 5% of furnace atmosphere by volume.

10. The method of claim 6, wherein the at least one additional gas comprises at most 10% of furnace atmosphere by volume.

11. The method of claim 1, wherein setting or adjusting the pressure of the furnace atmosphere comprises reducing the pressure.

12. The method of claim 1, wherein setting or adjusting the pressure of the furnace atmosphere comprises creating positive pressure in the furnace.

13. The method of claim 1, wherein controlling the furnace atmosphere comprises filling the furnace with an inert gas when creating the non-vacuum environment in the furnace.

14. The method of claim 13, wherein the inert gas comprises Argon (Ar).

15. The method of claim 13, wherein controlling the furnace atmosphere further comprises, after filling of the furnace with the inert gas, adding at least one additional gas into the furnace.

16. The method of claim 15, comprising selecting the at least one additional gas based on at least one performance criterion, the at least one performance criterion comprising removal of oxygen.

17. The method of claim 15, wherein the at least one additional gas comprises one or more of hydrogen ($H_2$), carbon monoxide (CO), carbon dioxide/carbon monoxide ($CO_2$/CO) blend, and forming gas.

18. The method of claim 1, wherein controlling the furnace atmosphere comprises repeating, while processing the silicon-dominated electrode, the creating of a vacuum environment in the furnace, and subsequent creating of a non-vacuum environment in the furnace.

19. The method of claim 1, comprising configuring the controlling of the furnace atmosphere based on one or more cell performance parameters.

20. The method of claim 19, wherein the one or more cell performance parameters comprise capacity retention.

21. The method of claim 20, comprising configuring the controlling of the furnace atmosphere to increase capacity retention for a predefined number of cycles.

22. The method of claim 19, wherein the one or more cell performance parameters comprise resistance.

23. The method of claim 22, comprising configuring the controlling of the furnace atmosphere to reduce increase in resistance for a predefined number of cycles.

24. A method for electrode processing, the method comprising:
controlling furnace atmosphere during processing of a silicon-dominated electrode in a furnace, wherein:
the processing comprises pyrolysis of the silicon-dominated electrode; and
the controlling comprises:
performing the pyrolysis in oxygen-free environment;
creating a vacuum environment in the furnace;
subsequently creating a non-vacuum environment in the furnace, wherein creating the non-vacuum environment comprises setting or adjusting one or both of: pressure of the furnace atmosphere, and composition of the furnace atmosphere; and
applying one or more measures when performing the pyrolysis to maintain at least one environment condition created within the furnace prior to initiating of the pyrolysis;
wherein controlling the furnace atmosphere comprises repeating, while processing the silicon-dominated electrode and without adding new material to the silicon-dominated electrode, the creating of a vacuum environment in the furnace, and the subsequent creating of a non-vacuum environment in the furnace.

* * * * *